United States Patent
Sung et al.

(10) Patent No.: US 9,338,441 B2
(45) Date of Patent: May 10, 2016

(54) 3D DISPLAY DEVICE AND METHODS THEREOF

(71) Applicants: Si-Duk Sung, Yongin (KR); Kwang-Sub Shin, Yongin (KR); Jong-Hwa Park, Yongin (KR); Baek-Woon Lee, Yongin (KR)

(72) Inventors: Si-Duk Sung, Yongin (KR); Kwang-Sub Shin, Yongin (KR); Jong-Hwa Park, Yongin (KR); Baek-Woon Lee, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 502 days.

(21) Appl. No.: 13/679,289

(22) Filed: Nov. 16, 2012

(65) Prior Publication Data

US 2013/0128015 A1 May 23, 2013

(30) Foreign Application Priority Data

Nov. 18, 2011 (KR) ........................ 10-2011-0120916

(51) Int. Cl.
*H04N 13/04* (2006.01)
*G09G 3/00* (2006.01)
*G09G 3/32* (2016.01)

(52) U.S. Cl.
CPC ............ *H04N 13/04* (2013.01); *G09G 3/003* (2013.01); *G09G 3/3233* (2013.01); *H04N 13/0438* (2013.01); *H04N 13/0497* (2013.01); *G09G 2300/0852* (2013.01); *G09G 2300/0861* (2013.01); *H04N 2013/0465* (2013.01)

(58) Field of Classification Search
USPC ...................................... 348/42, 55; 345/690
See application file for complete search history.

(56) References Cited

U.S. PATENT DOCUMENTS

| 4,562,463 A | 12/1985 | Lipton |
| 2007/0035487 A1* | 2/2007 | Ryu et al. ................. 345/76 |
| 2010/0097525 A1 | 4/2010 | Mino |
| 2010/0177171 A1 | 7/2010 | Marcus et al. |
| 2011/0279484 A1* | 11/2011 | Han et al. ................ 345/690 |
| 2012/0098874 A1* | 4/2012 | Kubota ..................... 345/690 |

FOREIGN PATENT DOCUMENTS

| CN | 102238403 | 11/2011 |
| EP | 1 936 596 A1 | 6/2008 |
| EP | 2 385 706 A1 | 11/2009 |

(Continued)

OTHER PUBLICATIONS

Chun-Ho Chen et al:"3-D Mobile Display Based on Moire-Free Dual Directional Backlight and Driving Scheme for Image Crosstalk Reduction," Journal of Display Technology, Mar. 2008, pp. 92-96, vol. 4, No. 1, IEEE Serivce Center, New York, NY, US.

(Continued)

*Primary Examiner* — Jason Olson
*Assistant Examiner* — Deeprose Subedi
(74) *Attorney, Agent, or Firm* — Lee & Morse, P.C.

(57) ABSTRACT

A display device configured to display a selected image type, the image type including a first image and a second image, according to an image source signal, the display device including: a display unit, the display unit including a first group pixel and a second group pixel; and an image processor, the image processor: arranging image signals for each frame of the display device according to a display sequence of the first image and the second image in the first group pixel and the second group pixel, changing the image type displayed during a remaining period for each frame unit of the image source signal.

33 Claims, 9 Drawing Sheets

(56) References Cited

FOREIGN PATENT DOCUMENTS

| | | |
|---|---|---|
| JP | 04345197 A | 1/1992 |
| JP | 07-028434 A | 1/1995 |
| JP | 2010534004 A | 10/2010 |
| KR | 10-2007-0015686 A | 2/2007 |
| KR | 10-2010-0019366 A | 2/2010 |
| KR | 10-2011-0013693 A | 2/2011 |
| KR | 10-2011-0024642 A | 3/2011 |
| KR | 10-2011-0050178 A | 5/2011 |
| KR | 10-2011-0062764 A | 6/2011 |
| WO | 2009/002314 A1 | 12/2008 |

OTHER PUBLICATIONS

Extended European Search Report dated Nov. 22, 2013.

\* cited by examiner

3D DISPLAY DEVICE AND METHODS THEREOF

BACKGROUND

1. Field

Embodiments relate to a display device and a driving method thereof.

2. Description of the Related Art

When a display device displays a stereoscopic image or 3D image, the display device may alternately display a left-eye image and a right-eye image. In this case, a frame frequency of an image source signal input to the display device may be different from a driving frequency of the display device. For example, a driving frequency of the display device may be 240 Hz and a frame frequency of the image source signal may be 24 Hz, and a total of 10 left-eye and right-eye images may be displayed in the display device during one frame period of the image source signal.

When the display device displays two different images A and B as a stereoscopic image under such a condition, the display device arranges a left-eye image and a right-eye image of the first image A and a left-eye image and a right-eye image of the second image B to form 10 images during one frame period of the image source signal. Thus, one of the first image A and the second image B may be displayed one more time than the other image when 10 images are formed in one frame period.

The above information disclosed in this Background section is only for enhancement of understanding of the background of the invention and therefore it may contain information that does not form the prior art that is already known in this country to a person of ordinary skill in the art.

SUMMARY

Embodiments are directed to a display device configured to display a selected image type, the image type including a first image and a second image, according to an image source signal, the display device including: a display unit, the display unit including a first group pixel and a second group pixel; and an image processor, the image processor: arranging image signals for each frame of the display device according to a display sequence of the first image and the second image in the first group pixel and the second group pixel, changing the image type displayed during a remaining period for each frame unit of the image source signal, where the remaining period is a period remaining after dividing the frame unit of the image source signal by an integer multiple of a unit display period, where the unit display period is a period during which the first image and the second image are time-divided and displayed in the first group pixel and the second group pixel, and adding an image source signal alignment corresponding to the remaining period to an image source signal alignment of a period corresponding to the integer multiple of the unit display period.

In an embodiment, the image processor: determines a first left-eye image signal, a first right-eye image signal, a second left-eye image signal, and a second right-eye image signal included in the image source signal as an image signal respectively displayed in the first group pixel and the second group pixel per one frame unit of the image source signal, and forms a basic alignment corresponding to the unit display period by arranging the determined image signals according to the display sequence.

In an embodiment, the image processor forms the basic alignment by arranging image signals according to a sequence of an image signal displayed in the first group pixel among the first left-eye image signal, an image signal displayed in the second group pixel among the first left-eye image signal, an image signal displayed in the first group pixel among the first right-eye image signal, an image signal displayed in the second group pixel among the first right-eye image signal, an image signal displayed in the first group pixel among the second left-eye image signal, an image signal displayed in the second group pixel among the second left-eye image signal, an image signal displayed in the first group pixel among the second right-eye image signal, and an image signal displayed in the second group pixel among the second right-eye image signal.

In an embodiment, the image processor forms the basic alignment by arranging image signals according to a sequence of an image signal displayed in the first group pixel among the first right-eye image signal, an image signal displayed in the second group pixel among the first right-eye image signal, an image signal displayed in the first group pixel among the first left-eye image signal, an image signal displayed in the second group pixel among the first left-eye image signal, an image signal displayed in the first group pixel among the second right-eye image signal, an image signal displayed in the second group pixel among the second right-eye image signal, an image signal displayed in the first group pixel among the second left-eye image signal, and an image signal displayed in the second group pixel among the second left-eye image signal.

In an embodiment, the image processor: repeats the basic alignment an integer multiple of times in the unit display period, and arranges image signals of the image type corresponding to the current frame unit of the image source signal among the determined image signals and adds the arranged image signals to the repeated basic alignment.

In an embodiment, the display unit further includes a plurality of scan lines transmitting a plurality of scan signals to the first and second group pixels, the display unit further includes a plurality of data lines transmitting a plurality of data signals to the first and second group pixels, and a light emission period, during which the first group pixels emit light according to the plurality of data signals, and a scan period, during which the plurality of data signals is transmitted to the second group pixels, overlap each other.

In an embodiment, each of the first and second group pixels includes a driving transistor providing a driving current according to a written data signal, and includes an organic light emitting diode connected to the driving transistor and emitting light according to the driving current, and a first power source voltage applied to the driving transistor is lower than a second power source voltage applied to a cathode of the organic light emitting diode during a reset period, the reset period being a period during which a voltage of an anode of the organic light emitting diode is reset.

In an embodiment, each of the first and second group pixels includes a capacitor connected to a gate of the driving transistor, the capacitor being coupled to the first power source voltage, and a threshold voltage of the driving transistor is stored in the capacitor during a compensation period, the compensation period being a period during which the driving transistor is diode-connected.

In an embodiment, the first power source voltage of the light emission period is higher than the first power source voltage of the reset period, the compensation period, and the scan period.

In an embodiment, one frame of the display device includes the reset period, the compensation period, the scan period, and the light emission period, and is operated in a sequence of the reset period, the compensation period, the scan period, and the light emission period.

In an embodiment, blank periods between first fields, formed of frames in which the first group pixel emits light, and second fields, formed of frames in which the second group pixel emits light, are set to be different from each other according to at least one of the image type and a view point of an image between adjacent first and second fields.

In an embodiment, numbers of blanks between the first fields and the second fields are set to be different from each other according to at least one of the image type and the view point of the image, the number of blanks between the first field and the second field indicating a period between a light emission period of the first field and a light emission period of an adjacent second field.

In an embodiment, the numbers of blanks are set to be different from each other according to at least one of the image type and the view point of the image in order to prevent the number of blanks from being a fractional number.

In an embodiment, a default number of blanks is set to an integer acquired by dividing the number of blanks allocated to each frame unit of the image source signal by the number of frames of the display device included in one frame unit of the image source signal and eliminating numbers below the decimal point from the division result, and, when the image type of the first field is different from the image type of an adjacent second field, the number of blanks is set to be greater than the default number of blanks.

In an embodiment, an integer acquired by dividing the number of blanks allocated to each frame unit of the image source signal by the number of frames of the display device included in one frame unit of the image source signal and eliminating numbers below the decimal point from the division result is set to a default number of blanks, and, when a view point of an image of the first field is different from that a view point of an image of an adjacent second field, the number of blanks is set to be greater than the default number of blanks.

In an embodiment, the display device further includes a timing controller setting the numbers of blanks between vertical synchronization signals to be different from each other according to the image type and a view point of an image between adjacent fields.

In an embodiment, the display device is configured to operate in concert with first shutter spectacles that are opened while the first image is displayed in the first group pixel and the second group pixel, and the display device is configured to operate in concert with second shutter spectacles that are opened while the second image is displayed in the first group pixel and the second group pixel.

In an embodiment, the first shutter spectacles include a first left-eye lens opened while a first left-eye image signal of the first image is displayed in the first group pixel and the second group pixel, and include a second right-eye lens opened while a first right-eye image signal of the first image is displayed in the first group pixel and the second group pixel, and the second shutter spectacles include a second left-eye lens opened while a second left-eye image signal of the second image is displayed in the first group pixel and the second group pixel, and include a second right-eye lens opened while a second right-eye image signal of the second image is displayed in the first group pixel and the second group pixel.

Embodiments are also directed to a display device configured to display a selected image type, the image type including a first image and a second image, as a stereoscopic image according to an image source signal representing the first image and the second image, the display device including a display unit including a first group pixel and a second group pixel; an image processor arranging the image source signal for each frame unit of the image source signal according to a display sequence of the first image and the second image in the first group pixel and the second group pixel; and a timing controller setting blank periods between first fields formed of frames during which the first group pixel emits light and second fields formed of frames during which the second group pixel emits light according to at least one of the image type and a view point of an image between a first field and a second field that are adjacent to each other.

In an embodiment, the image source signal includes a first left-eye image signal, a first right-eye image signal, a second left-eye image signal, and a second right-eye image signal, a unit display period is a period during which the first left-eye image signal, the first right-eye image signal, the second left-eye image signal, and the second right-eye image signal are displayed according to the display sequence in the first group pixel and the second group pixel by one frame unit of the image source signal, and the image processor changes the image type displayed during a remaining period, other than a period that is an integer multiple of the unit display period, of one frame unit of the image source signal, and adds an image source signal alignment corresponding to the remaining period to an image source signal alignment corresponding to the period of integer that is the multiple of the unit display period.

In an embodiment, a view point of the image of the first left-eye image signal is different from a view point of the image of the right-eye image signal, and a view point of the image of the second left-eye image signal is different from a view point of the image of the second right-eye image signal.

In an embodiment, one frame of the display device includes a scan period, during which a data signal is written in a plurality of pixels, and includes a light emission period, during which the plurality of pixels emit light according to the written data signal, and a light emission period of the first field and a scan period of the second field overlap each other.

In an embodiment, the frame of the display device further includes: a reset period for resetting an anode voltage of an organic light emitting diode of the pixel, and a compensation period compensating a threshold voltage of a driving transistor supplying a driving current to the organic light emitting diode.

In an embodiment, a level of a first power source voltage supplied to the driving transistor is different among at least one of the reset period, the compensation period, and the scan period during the light emission period.

Embodiments are also directed to a driving method of a display device that includes a first group pixel and a second group pixel, the method including: arranging image source signals representing a first image and a second image according to a display sequence of the first image and the second image in the first group pixel and the second group pixel for each frame unit of the image source signal; repeating a basic alignment corresponding to a unit display period by a number of times that the unit display period is included in the frame unit of the image source signal, the unit display period being a period during which the first image and the second image are displayed in the first group pixel and the second group pixel for each frame of the display device; alternately selecting an image type to be displayed during a remaining period, the remaining period being a period after the unit display period is passed the integer multiple during one frame period of the image source signal by one frame unit of the image source signal, and adding, to the repeated basic alignment, an image source signal alignment corresponding to the remaining period.

In an embodiment, the arranging of the image source signals includes: determining each of a first left-eye image signal, a first right-eye image signal, a second left-eye image signal, and a second right-eye image signal included in the image source signal for an image signal displayed in the first group pixel and an image signal displayed in the second group pixel for each frame unit of the image source signal; and forming the basic alignment by arranging the determined image signals according to the display sequence.

In an embodiment, the adding of the image source signal alignment corresponding to the remaining period includes: arranging image signals of the selected image type among the determined image signals by a number of frames of the display device, corresponding to the remaining period, and adding the arranged image signals to the repeated basic alignment.

In an embodiment, the method further includes: a light emission step of the first group pixel according to a plurality of written data signals; and a scan step for transmitting a plurality of data signals to the second group pixel, wherein the light emission step and the scan step are temporally overlapped with each other.

In an embodiment, the method further includes: resetting a voltage of an anode of an organic light emitting diode connected to a driving transistor, to which a driving current flows according to a written data signal, emitting light according to the driving current by decreasing a first power source voltage applied to the driving transistor; and a compensation step for diode-connection of the driving transistor and storing a threshold voltage of the driving transistor in a capacitor.

In an embodiment, the method further includes setting blank periods between first fields, formed of frames during which the first group pixel emits light, and second fields, formed of frames during which the second group pixel emits light, to be different from each other according to at least one of the image type and a view point of an image between adjacent first and second fields.

In an embodiment, the setting of the blank periods includes setting numbers of blanks between the first fields and the second fields to be different from each other according to at least one of the image type and a view point of an image between the first field and the second field, and the number of blanks between the first field and the second field represents a period between a light emission period of the first field and a light emission period of an adjacent second field.

In an embodiment, the setting of the number of blanks includes: setting a default number of blanks with an integer acquired by dividing the number of blanks allocated to each frame unit of the image source signal by the number of frames of the display device included in one frame unit of the image source signal, and eliminating numbers below the decimal point from the division; and setting the number of blanks to be greater than the default number of blanks when the image type of the first field is different from the image type of an adjacent second field.

In an embodiment, the setting of the number of blanks includes: setting a default number of blanks with an integer acquired by dividing the number of blanks allocated to each frame unit of the image source signal by the number of frames of the display device included in one frame unit of the image source signal, and eliminating numbers below the decimal point; and setting the number of blanks to be greater than the default number of blanks when a view point of the first field is different from a view point of an adjacent second field.

BRIEF DESCRIPTION OF THE DRAWINGS

Features will become apparent to those of skill in the art by describing in detail example embodiments with reference to the attached drawings in which.

DETAILED DESCRIPTION

Figure 1:
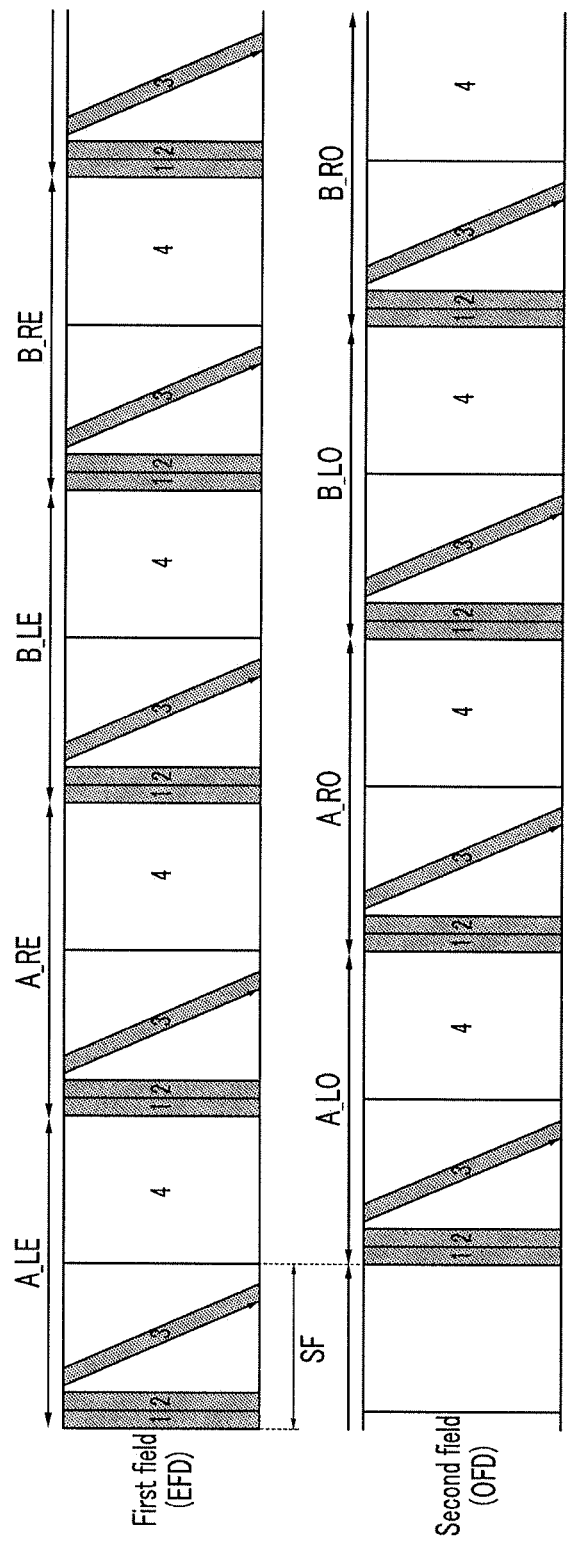
FIG. 1 illustrates a driving method of a display device according to an example embodiment.

Korean Patent Application No. 10-2011-0120916, filed on Nov. 18, 2011, in the Korean Intellectual Property Office, and entitled: "Display Device and Driving Method Thereof," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising," will be understood to imply the inclusion of stated elements but not the exclusion of any other elements.

FIG. 1 illustrates a driving method of a display device according to an example embodiment.

In the present example embodiment, a panel of a display device includes a first group pixel E and a second group pixel O. The first group pixel E includes pixels emitting light in an odd-numbered frame, and the second group pixel O includes pixels emitting light in an even-numbered frame.

Hereinafter, a sequential alignment of a plurality of odd numbered frames will be referred to as a first field EFD, and a sequential alignment of a plurality of even numbered frames will be referred to as a second field OFD.

In the present example embodiment, the display device displays two different first images A and B as stereoscopic images. The display device displays a left-eye image A_L of the image A in a frame A_LE of the first field EFD and a frame A_LO of the second field OFD, and displays a right-eye image A-R of the image A in a frame A_RE of the first field EFD and a frame A_RO of the second field OFD. A view point of the left-eye image is a left eye and a view point of the right-eye image is a right-eye.

Subsequent to the image A, the display device displays a left-eye image of the image B in a frame B_LE of the first field EFD and a frame B_LO of the second field OFD, and displays a right-eye image of the image B in a frame B_RE of the first field EFD and a frame B_RO of the second field OFD.

In another implementation, the right-eye image A_R of the image A may be displayed prior to the left-eye image A_L. In another implementation, the right-eye image B_R of the image B may be displayed prior to the left-eye image B_L.

In the example embodiment shown in FIG. 1, each frame sequentially includes a reset period 1, a compensation period 2, a scan period 3, and a light emission period 4. Each period will be described below. The first field EFD and the second field OFD are driven by being synchronized while being time shifted, relative to each other, by a predetermined period SF.

In further detail, the frame A_LO of the second field OFD (which is temporally adjacent to the frame A_LE of the first field EFD) is shifted by the period SF from the frame A_LE. In the present example embodiment, the period SF is set to prevent the scan periods 3 of the respective fields from being overlapped with each other.

During the light emission period 4 of the first group pixel, the scan period 3 is generated during which a data signal corresponding to each of the second group pixels is written. During the light emission period 4 of the second group pixel, the scan period 3 is generated during which a data signal corresponding to each of the first group pixels. Thus, the scan periods 3 may be sufficiently assured and, accordingly, a temporal margin for driving of the display panel may be increased. In addition, since a scan frequency may be decreased, bandwidths of the data driver generating and transmitting the data signal and the scan driver generating the scan signal may be decreased, which may reduce a cost of circuit parts.

In the present example embodiment, the light emission period 4 of the first group pixel E and the light emission period 4 of the second group pixel O are separated from each other. Thus, a maximum current for light emission duration may be decreased and, accordingly, a cost of a power source circuit for supplying power to the display device may be reduced.

Figure 2:
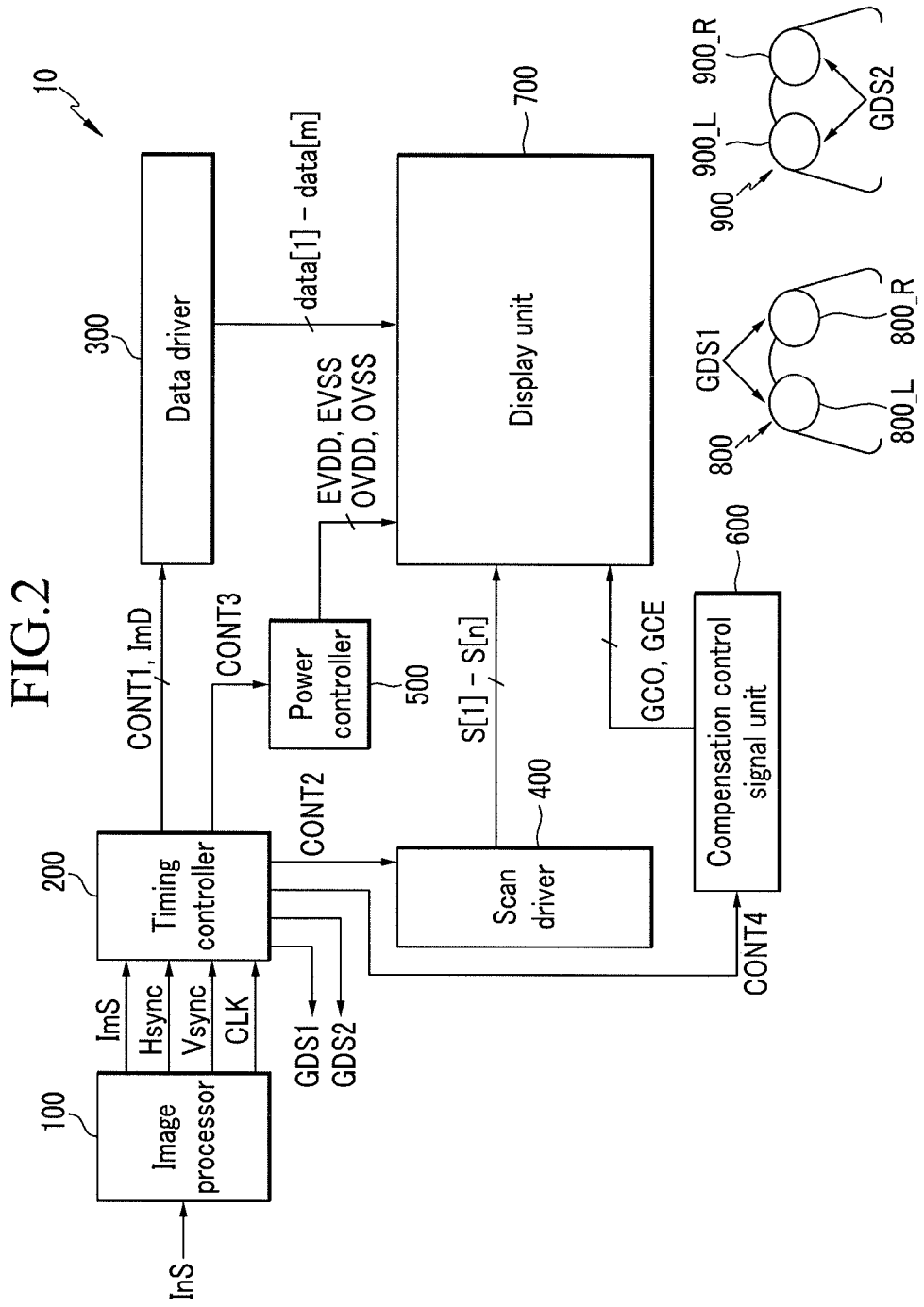
FIG. 2 illustrates a display device according to an example embodiment.

FIG. 2 illustrates a display device according to an example embodiment.

In the example embodiment shown in FIG. 2, a display device 10 includes a display unit 700, and may further include one or more of an image processor 100, a timing controller 200, a data driver 300, a scan driver 400, a power controller 500, and a compensation control signal unit 600.

In the present example embodiment, the image processor 100 generates an image display signal ImS and a synchronization signal from an input signal InS. The synchronization signal includes a horizontal synchronization signal Hsync, a vertical synchronization signal Vsync, and a main clock signal CLK.

When a signal (hereinafter, an image source signal) for two images A and B included in the image signal InS is a signal displaying a stereoscopic image, the image processor 100 determines whether the signal is a left-eye image signal (indicating a left-eye image) or a right-eye image signal (indicating a right-eye image).

The input signal InS input to the image processor 100 according to the present example embodiment includes image source signals indicating two different images, that is, a first image A and a second image B.

The image processor 100 arranges image source signals for each frame unit according to a display sequence of the first image A and the second image B in the first group pixel E and the second group pixel O.

The image processor 100 changes the type of an image displayed during a remaining period, i.e., a period that remains after a period that corresponds to integer multiples of a "unit display period" in one frame unit of the image source signal. As described in greater detail below, the unit display period is a period in which the first image A and the second image B are respectively time-divided and displayed (in the first group pixel E and the second group pixel O) in a frame unit of the image source signal.

In further detail, the image source signal included in the image signal InS includes a first image source signal AS (indicating the first image A) and a second image source signal BS (indicating the second image B). The display device 10 according to the present example embodiment displays the first image A and the second image B as a stereoscopic image.

In the present example embodiment, the first image source signal AS includes a first left-eye image signal ASL and a first right-eye image signal ASR. The second image source signal BS includes a second left-eye image signal BSL and a second right-eye image signal BSR.

The image processor 100 detects the first left-eye image signal ASL, the first right-eye image signal ASR, the second left-eye image signal BSL, and the second right-eye image signal BSR from the input signal InS. The image processor 100 arranges the first left-eye image signal ASL, the first right-eye image signal ASR, the second left-eye image signal BSL, and the second right-eye image signal BSR according to a display sequence.

The display sequence refers to a sequence of displaying the first image A and the second image B in the first group pixel E and the second group pixel O. For example, in the present example embodiment, the first left-eye image signal ASL is displayed in the first group pixel E with one frame and in the second group pixel O with one frame, and the first right-eye image signal ASR is displayed in the first group pixel E with one frame and in the second group pixel O with one frame. Subsequently, the second left-eye image signal BSL is displayed in the first group pixel E with one frame and in the second group pixel O with one frame, and the second right-eye image signal BSR is displayed in the first group pixel E with one frame and in the second group pixel O with one frame. In this case, the unit display period corresponds to a period during which 8 frames (i.e., frames corresponding to ASL-E, ASL-O, ASR-E, ASR-O, BSL-E, BSL-O, BSR-E, and BSR-O) are displayed.

Hereinafter, the 8 frames will be described as a "basic alignment" in the example embodiment.

In the present example embodiment, the image processor 100 divides the first left-eye image signal ASL into the image signal ASL_E written in the first group pixel E and the image signal ASL_O written in the second group pixel O. Similarly, the image processor 100 divides the first right-eye image signal ASR, the second left-eye image signal BSL, and the second right-eye image signal BSR respectively as image signals ASR_E, BSL_E, and BSR_E written in the first group pixel E, and image signals ASR_O, BSL_O, and BSR_O written in the second group pixel O.

The image processor 100 arranges the image signals ASL_E, ASR_E, BSL_E, and BSR_E, and the image signals ASL_O, ASR_O, BSL_O, and BSR_O in one frame unit according to the display sequence. The basic alignment is formed by arranging each frame of the image signals ASL_E, ASL_O, ASR_E, ASR_O, BSL_E, BSL_O, BSR_E, and BSR_O according to the display sequence of FIG. 1.

In another implementation, the basic alignment may have the right-eye image displayed ahead of the left-eye image, and the image processor 100 may arrange each frame of the plurality of image signals as ASR_E, ASR_O, ASL_E, ASL_O, BSR_E, BSR_O, BSL_E, and BSL_O.

Figure 3:
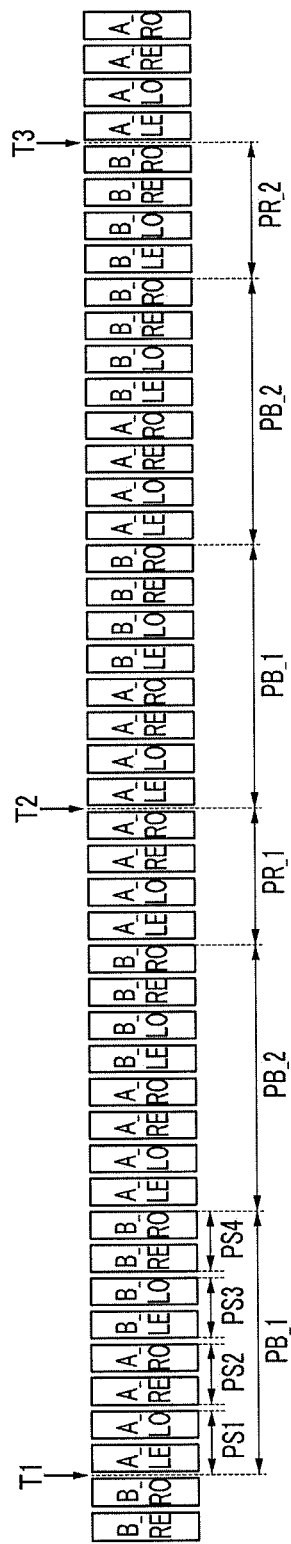
FIG. 3 illustrates a plurality of frames displayed by the display device during two frames of an image source signal.

FIG. 3 shows a plurality of frames displayed by the display device during two frames of the image source signal according to an example embodiment.

In the example embodiment shown in FIG. 3, one frame unit of the image source signal corresponds to a period from a time T1 to a time T2. A successive frame unit of the image source signal corresponds to a period from the time T2 to a time T3.

In the example embodiment shown in FIG. 3, a unit display period PB is included two times (PB_1 and PB_2) in the period T1 to T2. The unit display period PB is a period during which an image is displayed according to the basic alignment. Thus, the unit display period PB may include the above-stated sequence of image signals ASL_E, ASL_O, ASR_E, ASR_O, BSL_E, BSL_O, BSR_E, and BSR_O, or integer multiples of the sequence.

In FIG. 3, PR is a period that remains after dividing one frame unit of the image source signal (i.e., dividing T1 to T2, or dividing T2 to T3) by an integer multiple of the unit display period PB.

Referring to FIG. 3, a driving method for driving the display device, while changing the type of the image signal (A or B) during the remaining period PR, will now be described in further detail.

In the present example embodiment, the image type signals displayed during the remaining period PR are changed with each frame unit of the image source signal. For example, image type may alternate during the remaining period PR, i.e., the display of the first image A and the display of the second image B during the remaining period PR may alternate with each successive frame unit of the image source signal (e.g., A in PR_1 of T1 to T2, and B in PR_2 of T2 to T3).

As described above, in the present example embodiment, a period that is an integer multiple of the unit display period PB (e.g., 2 times PB; the integer is 2 in FIG. 3) is used to display an image according to the basic alignment, and the remaining period PR is used to display the first image A or the second image B as a stereoscopic image. This occurs in one frame unit of the image source signal. For example, in FIG. 3, two times PB plus PR for either A or B occurs in the respective image source signal frames T1 to T2 and T2 to T3. Thus, the type of the image (the first image A or the second image B) displayed during the remaining period PR may be changed per one frame unit of the image source signal.

FIG. 3 uses the reference numerals of FIG. 1 to determine the light emission period 4 of each frame of the display device 10. For example, in FIG. 3, A_LE and A_LO respectively indicate the light emission period 4 of the frame A_LE of the first field EFD and the light emission period 4 of the frame A_LO of the second field OFD.

As described, FIG. 3 illustrates that the unit display period PB is included two times in the period T1 to T2. In another implementation, the period T1 to T2 may include an integer multiple of the unit display period PB where the integer may be an integer other than two.

In the present example embodiment, PR is the period that remains after dividing one frame unit of the image source signal (i.e., dividing T1 to T2, or dividing T2 to T3) by the an integer multiple of the unit display period PB. Thus, the remaining period from dividing of the period T1 to T2 with two times the unit display period PB (i.e., PB_1 and PB_2) is PR_1.

In the present example embodiment, the display device 10 displays the image signals ASL_E, ASL_O, ASR_E, and ASR_O of the first image A during the remaining period PR_1 in the unit frame T1 to T2 in FIG. 3. Next, the display device 10 displays image signals BSL_E, BSL_O, BSR_E, and BSR_O of the second image B during a remaining period PR_2 in the frame period T2 to T3 of the next image source signal.

Thus, the image processor 100 alternately selects one of the first image A and the second image B for each frame unit of the image source signal, and additionally arranges image signals indicating the selected image after an integer multiple (two times in FIG. 3) of the unit display period PB.

As described, the image processor 100 generates an image display signal ImS by arranging the image signals ASL_E, ASL_O, ASR_E, ASR_O, BSL_E, BSL_O, BSR_E, and BSR_O indicating the first image A and the second image B for each frame unit of the image source signal.

The image processor 100 may generate a vertical synchronization signal Vsync, a horizontal synchronization signal Hsync, and a main clock signal CLK according to a driving frequency of the display device 10. The image processor 100 determines the number of times of basic alignment by dividing the driving frequency of the display device with a frame frequency of the image signal, and calculates a remaining period.

When the frame frequency is 24 Hz and the driving frequency is 240 Hz, the result of the division becomes 10. As shown in FIG. 1, one frame of the first field EFD and one frame of the second field OFD are displayed during one period operation of the display device 10. Thus, the display device 10 may display 20 images during one frame unit of the image source signal. The basic alignment is formed of 8 frames of the display device 10, and therefore the image processor 100 determines the number of times of the basic alignment to 2 and calculates the remaining period to four frames of the display device. The image processor 100 also determines the type of an image alternately displayed during the remaining period for each frame unit of the image source signal.

As described, the image processor 100 determines the number of times of basic alignment, a remaining period, and the image type displayed during the remaining period for each frame unit of the image source signal, and generates an image display signal ImS by arranging image signals according to the determination result.

In the present example embodiment, the timing controller 200 generates first to fourth driving control signals CONT1 to CONT4 and an image data signal ImD according to the image display signal ImS, the vertical synchronization signal Vsync, the horizontal synchronization signal H sync, and the main clock signal CLK.

In the present example embodiment, the timing controller 200 determines the image display signal ImS by a frame unit of the first or second field according to the vertical synchronization signal Vsync, generates the image data signal ImD by determining the image display signal ImS with a scan line unit according to the horizontal synchronization signal Hsync, and transmits the image data signal ImD and the first driving control signal CONT1 to the data driver 300.

In the present example embodiment, the data driver 300 samples and holds the image data signal ImD input according to the first driving control signal CONT1, and transmits a plurality of data signals data[1] to data[m] to respective data lines.

In the present example embodiment, the scan driver 400 generates a plurality of scan signals S[1] to S[n] with a gate-on level during a reset period 1 and a compensation period 2, simultaneously transmits a plurality of scan lines, sequentially generates the plurality of scan signals S[1] to S[n] with the gate-on level, and transmits the scan signal to the corresponding scan line among the plurality of scan lines according to the second driving control signal CONT2. During the light emission period 4, the scan driver 400 generates all the plurality of scan signals S[1] to S[n] with a gate-off level.

In the present example embodiment, the power controller 500 determines levels of power source voltages EVDD, EVSS, OVDD, and OVSS according to a reset period 1, a compensation period 2, a scan period 3, and a light emission period 4 of each of the first group pixel and the second group pixel according to the third driving control signal, and supplies the power source voltages to a power source line.

In the present example embodiment, the compensation control signal unit 600 determines levels of compensation control signals CGE and GCO during a compensation period 2 of each of the first and second group pixels according to the fourth driving control signal CONT4 and supplies the compensation control signals to a control signal line.

In the present example embodiment, the timing controller 200 generates a first spectacles driving signal GDS1 for controlling opening and closing of a left-eye lens 800_L and a right-eye lens 800_R of first shutter spectacles 800, and generates a second spectacles driving signal GDS2 for controlling of operation of a left-eye lens 900_L and a right-eye lens 900_R of second shutter spectacles 900.

Referring to FIGS. 2 and 3, the left-eye lens 800_L of the first shutter spectacles 800 is opened and the right-eye lens 800_R of the first shutter spectacles 800 is closed by the first spectacles driving signal GDS1 for a period PS1 during which an image according to left-eye image signals ASL_E and ASL_O of the first image A is displayed.

For a period PS2, during which an image according to right-eye image signals ASR_E and ASR_O of the first image A is displayed, the left-eye lens 800_L of the first shutter spectacles 800 is closed and the right-eye lens 800_R thereof is opened by the first spectacles driving signal GDS1.

For a period PS3, during which an image according to the left-eye image signals BSL_E and BSL_O of the second image B is displayed, the left-eye lens 900_L of the second shutter spectacles 900 is opened and the right-eye lens 900_R thereof is closed by the second spectacles driving signal GDS2.

For a period PS4, during which an image according to the right-eye image signals BSR_E and BSR_O of the second image B is displayed, the right-eye lens 900_R of the second shutter spectacles 900 is opened and the left-eye lens 900_L thereof is closed by the second spectacles driving signal GDS2.

In the present example embodiment, referring to FIG. 2, the display unit 700 includes a plurality of pixels as a display area including the first group pixels E and the second group pixels O. A plurality of data lines transmitting the plurality of data signals data[1]-data[n], a plurality of scan lines transmitting a plurality of scan signals S[1]-S[n], a plurality of power source lines, and a plurality of control signal lines are formed in the plurality of pixels, and the plurality of pixels are formed in areas where the plurality of data lines and the plurality of scan lines cross each other.

Figure 4:
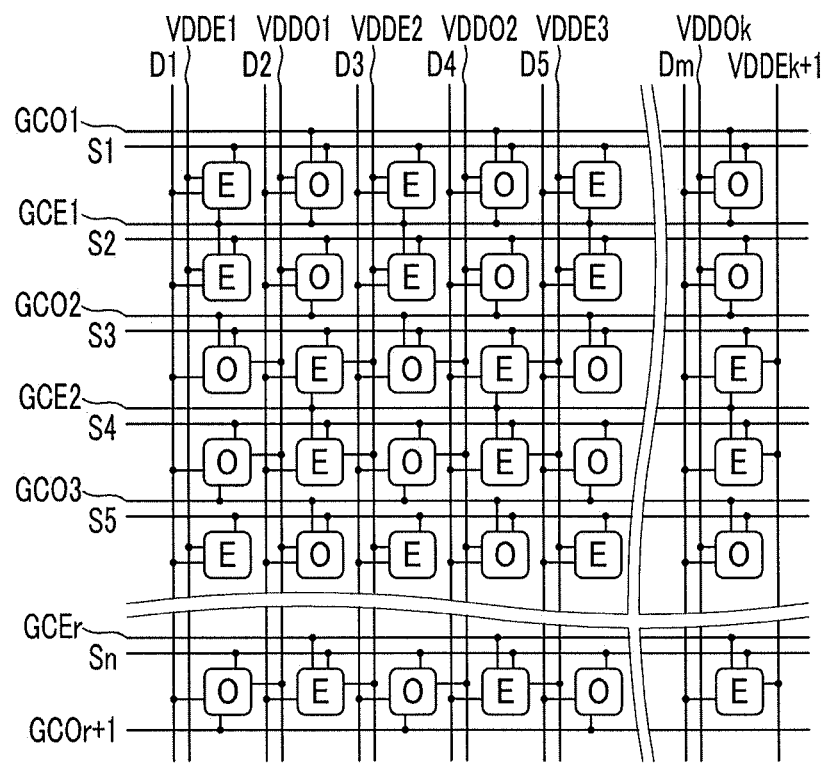
FIG. 4 illustrates a display portion according to an example embodiment.

FIG. 4 shows the display unit according to the example embodiment. In the display unit 700 of FIG. 4, the first group pixels E and the second group pixels O are respectively arranged in a 2×1 pattern, but embodiments are not limited thereto.

FIG. 4 illustrates a plurality of scan lines S1 to Sn transmitting a plurality of scan signals S[1]-S[n], a plurality of data lines D1 to Dm transmitting a plurality of data signals data[1]-data[m], a plurality of power source wires (VDDE1-VDDEk+1) supplying the first power source voltage EVDD to the first group pixels E, a plurality of second power source wires (VDDO1-VDDOk) supplying the power source voltage OVDD to the second group pixels O, a plurality of first control signal lines (GCE1-GCEr) transmitting the compensation control signal GCE to the first group pixels E, and a plurality of second control signal lines (GCO1-GCOr+1) transmitting the compensation signal GCO to the second group pixels O.

In FIG. 4, the first control signal lines (GCE1-GCEr) and the second control signal lines (GCO1-GCOr+1) are alternately arranged row by row. The first power source wires (VDDE1-VDDEk+1) and the second power source wires (VDDO1-VDDOk) are alternately arranged column by column.

In another implementation, the first control signal lines (GCE1-GCEr) and the second control signal lines (GCO1-GCOr+1) may be alternately arranged column by column, and the first power source wires (VDDE1-VDDEk+1) and the second power source wires (VDDO1-VDDOk) may be alternately arranged row by row.

In addition, a plurality of first control signal lines (GCE1-GCEr) and the plurality of second control signal lines (GCO1-GCOr+1) may be arranged row by row, and another plurality of first control signal lines and other plurality of second control signal lines may be alternately arranged column by column.

In addition, areas where a plurality of first control signal lines arranged in a row direction and a plurality of first control signal lines arranged in a column direction cross each other may be nodes where an electric connection is established. In addition, areas where the plurality of second control signal lines arranged in a row direction and the plurality of second control signal lines arranged in a column direction cross each other may be nodes where an electric connection is established. This may be referred to as a mesh structure. With the same manner, the plurality of first power source wires and the plurality of second power source wires may be formed in the mesh structure.

In the example embodiment shown in FIG. 4, the first group pixels E and the second group pixels O are alternately arranged in a 2×1 pattern in areas where the plurality of scan lines S1-Sm and the plurality of data lines D1-Dm cross each other. The alignment pattern of the first and second group pixels E and O is not limited to the 2×1 pattern, and various patterns may be applied.

In each row, the first group pixels E and the second group pixels O are alternately arranged. Each of the plurality of scan lines S1-Sn is connected with the first group pixels E and the second group pixels O of each row. Each of the plurality of data lines D1-Dm is connected to the first group pixels E and the second group pixels O of each column.

The second group pixels O connected to the scan lines S1 and Sn are connected to the second compensation control lines (GCO1 and GCOr+1). The first group pixel E connected to the scan line S1 and the first group pixel E connected to the second scan line S2 are connected to the first compensation control line GCE1. The second group pixel O connected to the scan line S2 and the second group pixel O connected to the scan line S3 are connected to the second compensation control line GCO2.

With the same connection manner, the first group pixels E and the second group pixels O are connected to the corresponding first or second compensation control line.

The first group pixels E connected to the data lines D1 and Dm are connected to the first power source wires (VDDE1 and VDDEk+1). The first group pixels E connected to the data lines D2 and D3 are connected to the first power source wire VDDE2. The second group pixels O connected to the data lines D1 and D2 are connected to the first power source wire VDDO1.

With the same connection manner, the first group pixels E and the second group pixels O are connected to the corresponding first or second compensation control line.

Figure 5:
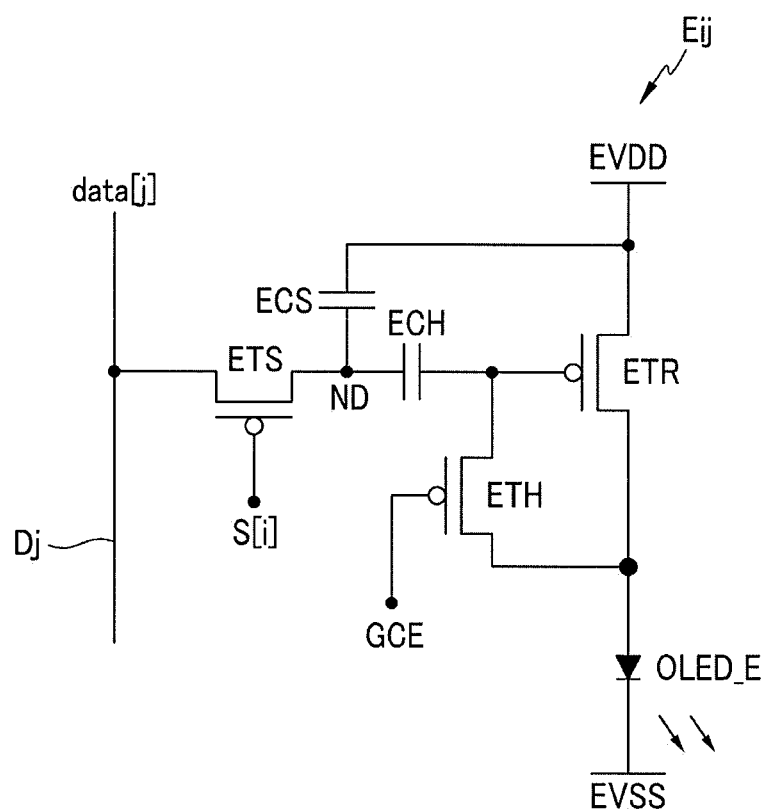
FIG. 5 illustrates a first group pixel.

FIG. 5 shows the first group pixel. FIG. 5 illustrates a first group pixel Eij connected to the scan line Si and the data line Dj.

As shown in FIG. 5, one pixel Eij of the first group pixels E includes a switching transistor ETS, a driving transistor ETR, a compensation transistor ETH, a compensation capacitor ECH, and a storage capacitor ECS.

The driving transistor ETR includes a drain electrode connected with an anode of an organic light emitting diode OLED_E, a gate electrode connected to a first electrode of the compensation capacitor ECH, and a source electrode connected to the first power source voltage EVDD. The driving transistor ETR controls a driving current supplied to the organic light emitting diode OLED_E.

The compensation transistor ETH includes a gate electrode to which a first compensation control signal GCE is input and two electrodes respectively connected to the drain electrode and the gate electrode of the driving transistor ETR.

A second electrode of the compensation capacitor ETH is connected to a first electrode of the storage capacitor ECS and a first electrode of the switching transistor ETS. A second electrode of the storage capacitor ECS is connected to the first power source voltage EVDD.

The scan signal S[i] is input to the gate electrode of the switching transistor ETS and the second electrode of the switching transistor ETS is connected to the data line Dj. The data signal data[j] is transmitted through the data line Dj.

A cathode of the organic light emitting diode OLED_E is connected to the second power source voltage EVSS.

The first power source voltage EVDD and the second power source voltage EVSS supply driving voltages for pixel operation. In further detail, the first power source voltage EVDD and the second power source voltage EVSS supply driving voltages for operation of each of the driving transistor ETR and the organic light emitting diode OLED_E during the reset period 1, the compensation period 2, the scan period 3, and the light emission period 4.

Hereinafter, a power source voltage connected to an anode through the driving transistor is referred to as a first power source voltage without regard to the first group pixel E and the second group pixel O, and a power source voltage connected to a cathode is referred to as a second power source voltage without regard to the first group pixel E and the second group pixel O.

Figure 6:
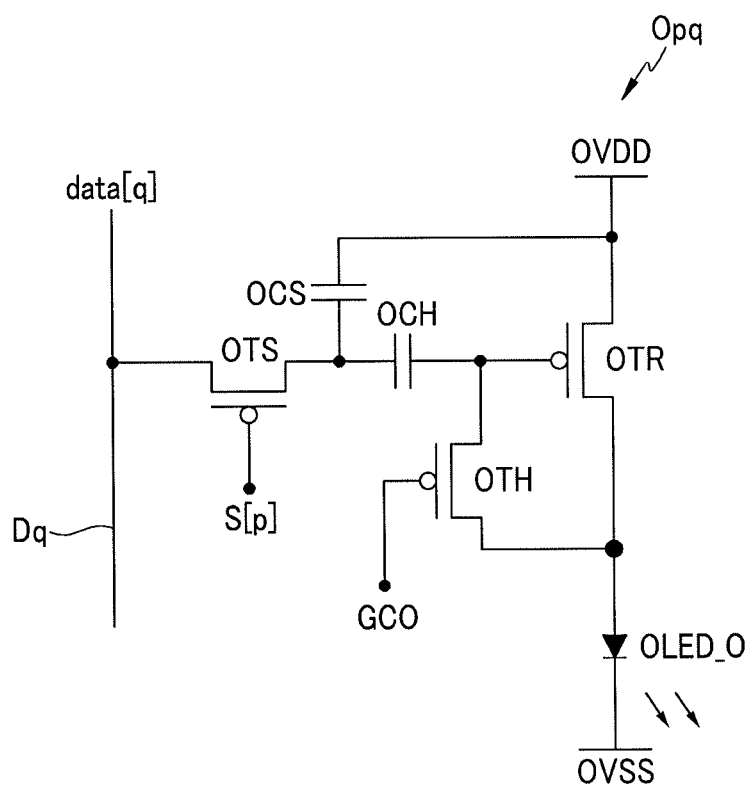
FIG. 6 illustrates a second group pixel.

FIG. 6 shows the second group pixel O. FIG. 6 illustrates a second group pixel Opq connected to a scan line Sp and a data line Dq.

As shown in FIG. 6, one pixel Opq of the second group pixels O includes a switching transistor OTS, a driving transistor OTR, a compensation transistor OTH, a compensation capacitor OCH, and a storage capacitor OCS.

The driving transistor OTR includes a drain electrode connected to the anode of an organic light emitting diode OLED_O, a gate electrode connected to a first electrode of the compensation capacitor OCH, and a source electrode connected to a third power source voltage OVDD.

The compensation transistor OTH includes a gate electrode to which a second compensation control signal GCO is input and two electrodes respectively connected to the drain electrode and the gate electrode of the driving transistor OTR.

The second electrode of the compensation capacitor OCH is connected to a first electrode of the storage capacitor OCS and a first electrode of the switching transistor OTS. A second electrode of the storage capacitor OCS is connected to the first power source voltage EVDD.

A scan signal S[p] is input to the gate electrode of the switching transistor OTS, and the second electrode of the switching transistor OTS is connected with the data line Dq. A data signal [k] is transmitted through the data line Dq.

The cathode of the organic light emitting diode OLED 0 is connected to the second power source voltage OVSS.

The first power source voltage OVDD has at least two levels according to the reset period 1, the compensation period 2, the scan period 3, and the light emission period 4. The second compensation control signal GCO has a level that turns on the compensation transistor OTH only during the compensation period 2.

Hereinafter, a driving method of the display device according to the example embodiment will be described with reference to FIG. 7 and FIG. 8.

First, one example of the driving method will be described with reference to FIG. 7.

Figure 7:
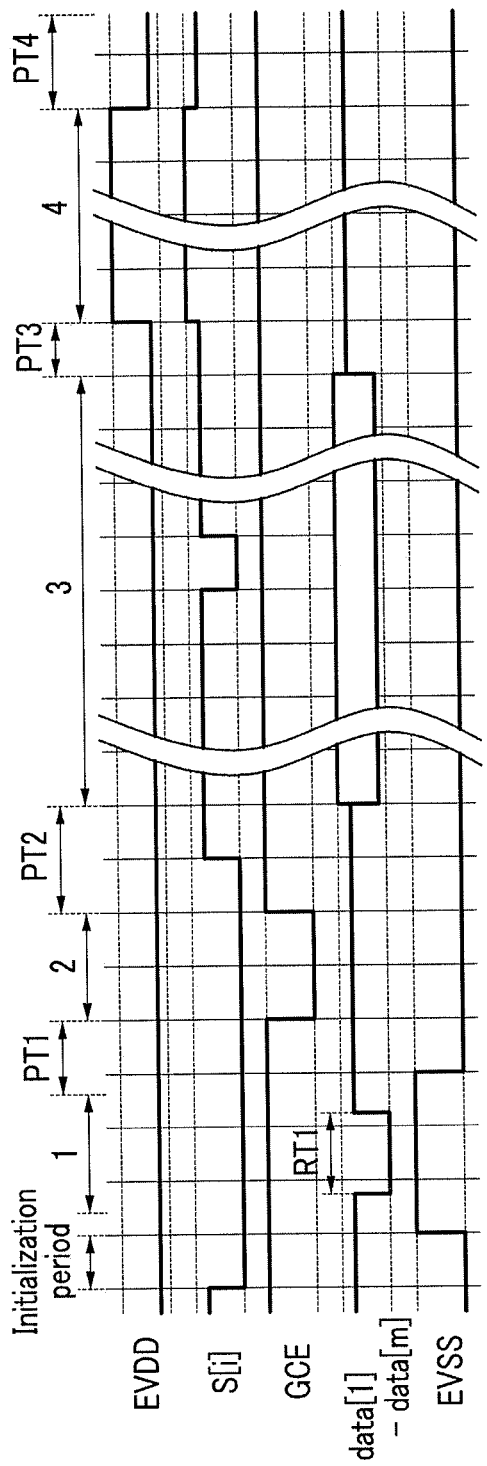
FIG. 7 illustrates a first power source voltage, a second power source voltage, a second power source voltage, a plurality of scan signals, a compensation control signal, and a data signal according to one of driving methods according to an example embodiment.

FIG. 7 shows a first power source voltage, a second power source voltage, a plurality of scan signals, a compensation control signal, and a data signal according to one of the driving methods of the example embodiment.

FIG. 7 illustrates that an initialization period is further included before a reset period 1, but the example embodiment may not include the initial period.

FIG. 7 shows waveforms of signals during one frame period of a first field. However, waveforms of signals during one frame period of a second field are the same as the waveforms shown in FIG. 7. Pixel operation by each signal will also be described with reference to FIG. 5.

During the initialization period, scan signals S[1]-S[n] are changed from high level to low level. In this case, since the data signals data[1]-data[m] have high level, the driving transistor ETR is turned off. During the initialization period, all the pixels are reset to a predetermined voltage. Since the initialization period is provided before operation of each frame begins, any influence of the previous frame may be eliminated and all the pixels perform compensation operation and data signal input operation under the same condition.

Since there is no influence of the previous frame, an input data signal input to the previous frame may be prevented from changing the initial operation state of the driving transistor. That is, deterioration of display quality (such as after-image, moving picture echo, crosstalk between left-eye and right-eye view points in 3D display) may be prevented and display quality may be uniformed.

The second power source voltage EVSS is maintained in high level during a reset period 1, and the plurality of data signals data[1]-data[n] become low level during the reset period 1 and maintain the low level for a predetermined period RT1.

When the voltage of the data signals data[1]-data[n] is low, the gate voltage of the driving transistors ETR and OTR of the pixel may be sufficiently decreased such that the driving transistors ETR and OTR can provide much more current. A voltage stored in an intrinsic capacitor of the organic light emitting diode OLED is discharged to make the anode voltages of the organic light emitting diodes OLED_E and OLED_O equal the power source voltages EVDD and OVDD during the reset period 1. Here, the voltage stored in the intrinsic capacitor is higher by about 0 to 3V than VSS. That is, the voltage of the data signals data[1]-data[n] becomes the lowest value such that the current driving capability of the driving transistors ETR and OTR becomes maximized, and accordingly the anode voltage of the organic light emitting diode OLED may be decreased within the shortest time.

During the reset period 1, the level of the plurality of scan signals S[1]-S[n] should be low level during at least a period overlapped with the period RT1 for a predetermined time period. In the example embodiment, the plurality of scan signals S[1]-S[n] are set to be in low level during the reset period 1 and the compensation period 2. FIG. 7 illustrates the scan signal S[i] among the plurality of scan signals S[1]-S[n].

A predetermined interval PT1 is provided between the reset period 1 and the compensation period 2. The second power source voltage EVSS is decreased to low level (i.e., 0V) at the termination time point of the reset period 1. The first compensation control signal GCE is decreased to low level at the start time point of the compensation period 2, and the first compensation control signal GCE maintains the low level during the compensation period 2. The plurality of data signals data[1]-data[m] are high level, and the first power source voltage EVDD maintains the low level.

The compensation transistor ETH is turned on according to the first compensation control signal GCE and thus the driving transistor ETR is diode-connected, and a voltage acquired by subtracting a threshold voltage VTH of the driving transistor ETR from the first power source voltage EVDD is supplied to the gate electrode of the driving transistor ETR. In this case, the compensation capacitor ECH is charged with a voltage corresponds to a difference between the voltage of the data signal data[j] and the (EVDD-VTH) voltage.

A predetermined interval PT2 is provided between the compensation period 2 and the scan period 3, and the plurality of scan signals S[1]-S[i] become high level during the interval PT2.

During the scan period 3, the plurality of scan signals S[1]-S[n] sequentially become low level such that the switching transistor ETS is turned on. While the switching transistor ETS is in the turn-on state, the data signal data[j] is transmitted to a node ND where the second electrode of the compensation capacitor ECH and the first electrode of the storage capacitor ECS meet each other.

The first electrode of the compensation capacitor ECH is connected to the gate electrode of the driving transistor ETR and is being floated. The variation of a voltage of the node ND is distributed according to a capacitor ratio between the storage capacitor ECS and the compensation capacitor ECH, and the voltage variation $\Delta V$ distributed to the compensation capacitor ECH is reflected to the gate voltage of the driving transistor ETR. Thus, the gate voltage of the driving transistor ETR becomes EVDD-VTH+$\Delta V$. Here, EVDD is an EVDD voltage level during the compensation period, that is, 3V for example.

When the scan period 3 is terminated, the plurality of data signals data[1]-data[m] become high level voltages, and a predetermined interval PT3 is provided between the scan period 3 and the light emission period 4.

When the light emission period 4 begins, the first power source voltage EVDD is increased to high level and the plurality of scan signals S[1]-S[n] are increased from the high level to a further higher level. When the scan signal S[i] is increased to the further higher level, the switching transistor ETS performs full-off such that a leakage current that may occur during the light emission period 4 may be blocked. Since the voltage of the node ND is approximately included within a voltage range of the data line Dj before the light emission period 4, a voltage difference between the drain electrode and the source electrode of the switch transistor ETS is insignificant.

When the first power source voltage EVDD is increased at the start time point of the light emission period 4, the voltage of the node ND and the gate voltage of the driving transistor ETR are increased due to coupling of the capacitors ECS and ECH.

For example, when the first power source voltage EVDD is increased from 2V to 12V, the voltage of the node ND is also increased by 10V so that the drain-source voltage of the switching transistor ETS is correspondingly increased. In general, the leakage current of the transistor is proportional to the drain-source voltage, the amount of the leakage current flowing to the data line from the node ND is increased.

Accordingly, when the voltage of the data line Dj is increased to at least a middle value of the voltage of the node ND, increased due to the coupling, the drain-source voltage may be decreased and accordingly the leakage current may be reduced.

For example, when the voltage range of the data signal is 1V to 6V during the scan period, the voltage of the node ND may be included in the voltage range right after the scan period. When the first power source voltage EVDD is increased by 10V, the voltage of the node ND has the voltage range of 11V to 16V, and in the worst case, the voltage of the data line Dj becomes 1V and the voltage of the node ND becomes 16V so that the drain-source voltage of the switching transistor becomes 15V.

However, when the voltage of the data line Dj is increased to 13.5V during the light emission period 4, the drain-source voltage becomes 2.5V in the worst case. Accordingly, the leakage current may be reduced approximately to 1/6 (15/2.5).

Since the first power source voltage EVDD is increased, a driving current is generated in the driving transistor ETR due to a source-gate voltage difference. Since a voltage obtained by subtracting the gate voltage EVDD(3V)-Vth+$\Delta V$ from the source voltage EVDD 12V of the driving transistor ETR and then the threshold voltage VTH is subtracted from the voltage, a driving current of the driving transistor ETR becomes a current corresponding to a square of the voltage (9V-$\Delta V$). That is, deviation due to the same data signals between driving currents does not occur due to a threshold voltage deviation between the driving transistors.

When the light emission period 4 is terminated, the first power source voltage EVDD becomes low level and a light emission off period PT4 is generated. The light emission off period PT4 is provided between the next frame and a current frame and pixels do not emit light during the light emission off period PT4.

FIG. 7 exemplarily illustrates pixels emitting light in the first field EFD, but pixels emitting light in the second field OFD emit light through the same method of the pixels emitting in the first field EFD. In addition, a high level or a low level is an example of a voltage level, and the voltage level is not limited thereto.

Figure 8:
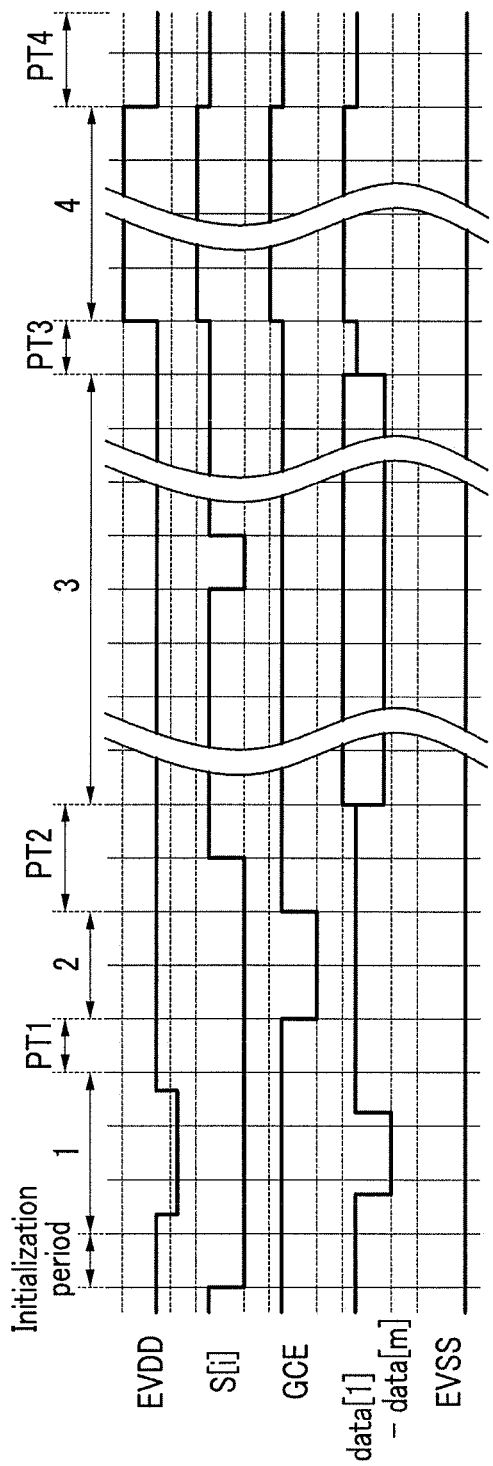
FIG. 8 illustrates a first power source voltage, a second power source voltage, a plurality of scan signal, a compensation control signal, and a data signal according to another driving method of the driving methods according to an example embodiment.

FIG. 8 shows a first power source voltage, a second power source voltage, a plurality of scan signals, a compensation control signal, and a data signal.

According to a driving method of FIG. 8, second power source voltages EVSS and OVSS are maintained with a constant voltage and supplied to one electrode of each pixel without regarding the first group pixels and the second group pixels.

Thus, the light emission period 4 of the first field EFD and the reset period 1 of the second field OFD should not overlap each other, and the light emission period 4 of the second field OFD and the reset period 1 of the first field EFD should not overlap each other.

In the reset period 1 of FIG. 8, a first power source voltage EVDD is lower than the first power source voltage EVDD in the reset period 1 of FIG. 1. For example, the first power source voltage EVDD of FIG. 7 may be 0V and the first power source voltage EVDD of FIG. 8 may be −3V. In FIG. 8, the second power source voltage EVSS is maintained in low level, that is, 0V.

When the first power source voltage EVDD is −3V, an anode voltage of the organic light emitting diode OLED becomes close to −3V and thus a reset operation is performed.

During the reset period 1, voltage levels of the plurality of scan signals S[1]-S[n] may be irrelevant to the reset operation.

During the reset period 1, a difference between the first power source voltage EVDD and the second power source voltage EVSS is reversed. Accordingly, the anode voltage of the organic light emitting diode OLED becomes higher than the first power source voltage EVDD, and the anode of the organic light emitting diode becomes a source of the driving transistor. Gate voltages of the driving transistors ETR and OTR are approximately similar to the first and second power source voltages EVDD and OVDD, and the anode voltages of the organic light emitting diodes OLED_E and OLED_O are voltages (power source voltage VSS+voltages (0 to 3V) stored in the organic light emitting diodes OLED_E and OLED_O, and therefore a gate-source voltage of each of the driving transistors ETR and OTR becomes a sufficient negative voltage such that the driving transistors ETR and OTR are turned on.

In this case, a current flowing through the driving transistors ETR and OTR flows toward the first and second power source voltages EVDD and OVDD from the anodes of the organic light emitting diodes OLED_E and OLED_O, and eventually it flows until the anode voltages of the organic light emitting diodes OLED_E and OLED_O become equal to the first and second power source voltages EVDD and OVDD. However, since the power source voltages EVDD and OVDD cannot be sufficiently low voltages, the gate voltages of the driving transistors ETR and OTR may not be able to be sufficiently low.

In order to prevent this, voltages of the data signals data[1]-data[m] may be set to be low voltages and the scan signals S[1]-S[n] may be low level to lower the gate voltages during the reset period 1. In FIG. 8, the data signal becomes a low voltage during the reset period 1. However, in another implementation, when the first power source voltage EVDD is sufficiently low, the data signal may not be changed to low level and all the scan signals may be set to high level.

When the reset operation is terminated in the reset period 1, the first power source voltage EVDD is increased to 3V from −3V. Operation of remaining periods are the same as that described with reference to FIG. 7, and therefore a further description will be repeated.

The display device according to the present example embodiment alternately displays one of the image A and the image B by each frame unit of an image signal during remaining periods in one frame unit of the image source signal. Accordingly, a difference in image quality between the two images may be prevented.

A predetermined blank period is provided between the plurality of light emission periods A_LE, A_LO, A_RE, A_RO, B_LE, B_LO, B_RE, and B_RO shown in FIG. 3. The blank period corresponds to a period between the light emission period 4 of the first field EFD and a light emission period 4 of its neighboring second field OED of FIG. 1. The blank period is represented by the number of blanks. The blank period is extended as the number of blanks is increased.

In the example embodiment, the number of blanks in one frame of an image source signal is set to 90. However, embodiments are not limited thereto. When each frame unit of the image source signal includes 20 light emission periods (refer to FIG. 3), the number of blanks for each light emission period becomes 4.5 if the 90 blanks are evenly divided. 0.5 is a fractional number, i.e., having a non-zero digit below the decimal point, and may require much more memory capacity when being realized as a digital signal. In addition, accurate and even division of the blanks for each light emission period may require complicated logic and cause costs to increase.

When the number of blanks is set to 4 by rounding 4.5 to 4, 14 blanks exist between adjacent light emission periods 4 during one frame period of the image source signal. Then, flicker may be viewed due to a blank period difference between the adjacent light emission periods 4. Therefore, according to the present example embodiment, blank periods between fields may be set to be different from each other according to the type of an image between adjacent fields. In another implementation, blank periods between fields may be set to be different from each other according to a view point of an image between adjacent fields. The left-eye image is an image generated with a view point of left-eye and the right-eye image is an image generated with a view point of right-eye. The number of blanks between fields may be set to be different from each other according to the type of an image and a view point of an image between adjacent fields.

That is, the numbers of blanks between fields are set to be different from each other according to at least one of the type of an image and a view point of an image between adjacent fields. In this case, the number of blanks may be set to be an integer that does not have numbers below the decimal point, i.e., a whole or non-fractional number.

Figure 9:
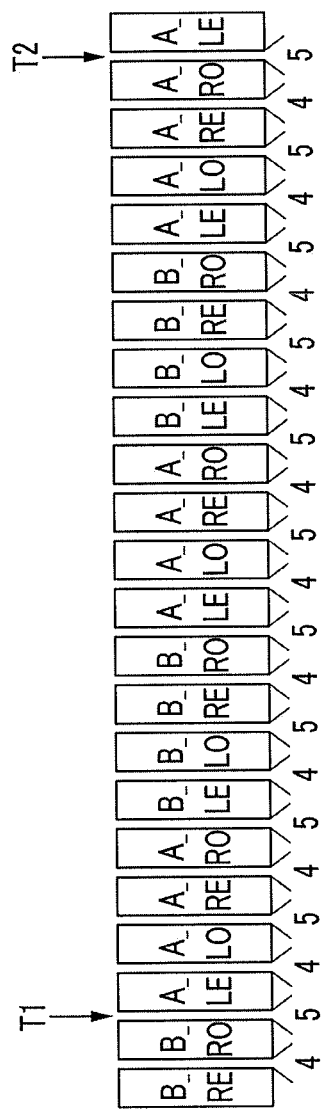
FIG. 9 illustrates the number of blanks between neighboring light emission periods in the driving method according to an example embodiment.

FIG. 9 shows the numbers of blanks between respective adjacent light emission periods in the driving method according to the example embodiment.

As shown in FIG. 9, a default number of blanks between a first field and a second field is acquired by dividing the number of blanks allocated to each frame of an image source signal by the number of frames of the display device 10 included in one frame unit of the image source signal, and eliminating numbers below the decimal point from the division result.

In addition, when images of adjacent fields have different view points, the number of blanks between a left-eye image and a right-eye image is larger by 1 than the default number of blanks. Further, the number of blanks between fields of different images is greater by 1 than the default number of blanks. "1" is an example, and remaining blanks are distributed to prevent a total number of blanks during one frame of an image source signal from having numbers below the decimal point.

The number of blanks between the first field in which the left-eye image A_LE of the first image A is displayed) and the second field in which the left-eye image A_LO of the first image A is displayed is set to 4. The number of blanks between the second field in which the left-eye image A_LO of the first image A is displayed and the first field in which the right-eye image A_RE of the first image A is displayed is set to 5. In addition, the number of blanks between the second field in which the right-eye image A_RO of the first image A is displayed and the first field in which the left-eye image B_LE of the second image B is set to 5.

A blank period may be controlled through such a method, thereby reducing or preventing occurrence of flickering.

The timing controller 200 sets the numbers of blanks between horizontal synchronization signals Vsync to be different from each other according to the type of an image or a view point of an image between adjacent fields to realize the method of FIG. 9. The number of blanks between the vertical synchronization signals Vsync implies the number of blanks between a time point instructing termination of the previous frame and a time point instructing start of a current frame.

For example, the timing controller 200 may set a default number of blanks 4 between vertical synchronization signals Vsync of each of adjacent fields displaying the same image, the number of blanks 5 between vertical synchronization signals Vsync of each of adjacent fields respectively displaying different images, and the number of blanks 5 between vertical synchronization signals Vsync of each of adjacent fields respectively having a different image view point to be different from each other.

In FIG. 9, the number of blanks 5 between the vertical synchronization signals Vsync of each of the adjacent fields respectively displaying different images and the number of blanks 5 between the vertical synchronization signals Vsync of each of the adjacent fields respectively having the different image view point are set to be equal to each other, but embodiments are not limited thereto. That is, the two numbers of blanks may be set to be different from each other.

By way of summation and review, an image quality difference between a first image A and a second image B may result when one of the first image A and the second image B is displayed one more time than the other image when, e.g., 10 images are formed in one frame period.

As described above, embodiments may provide a display device that can reduce motion artifact and increase light emission duration, and a driving method thereof. Embodiments may provide a display device that can display a stereoscopic image with a lower driving frequency in a large and/or high-resolution display device, and a driving method thereof. In addition, a display device that can prevent image quality difference between two different images displayed therein, and a driving method thereof may be provided.

As described above, embodiments may provide a display device that can display a stereoscopic image or a planar image in large and/or high resolution of the display device. Embodiments may be applied to, e.g., an active matrix type display device and a driving method thereof.

DESCRIPTION OF SYMBOLS image processor 100, timing controller 200, data driver 300
scan driver 400, power controller 500,
compensation control signal unit 600
display unit 700, first group pixel (E),
second group pixel (O), scan line (S1-Sm)
data line D1-Dm, switching transistor (ETS, OTS),
driving transistor (ETR, OTR)
compensation transistor (ETH, OTH),
compensation capacitor (ECH, OCH)
storage capacitor (ECS, OCS), pixel (Eij, Opq),
first image source signal AS
first left-eye image signal ASL, first right-eye image signal ASR
second image source signal BS, second left-eye image signal BSL
second right-eye image signal BSR,
input signal InS, image display signal (ImS)
image data signal (ImD), vertical synchronization signal Vsync,
horizontal synchronization signal Hsync
main clock signal CLK Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device configured to display a selected image type, the image type including a first image and a second image, according to an image source signal, the display device comprising:
   a display unit, the display unit including a first group pixel and a second group pixel; and
   an image processor, the image processor:
   arranging image signals for each frame of the display device according to a display sequence of the first image and the second image in the first group pixel and the second group pixel,
   changing the image type displayed during a remaining period for each frame unit of the image source signal, where the remaining period is a period remaining after dividing the frame unit of the image source signal by an integer multiple of a unit display period, where the unit display period is a period during which the first image and the second image are time-divided and displayed in the first group pixel and the second group pixel, and
   adding an image source signal alignment corresponding to the remaining period to an image source signal alignment of a period corresponding to the integer multiple of the unit display period.

2. The display device as claimed in claim 1, wherein the image processor:
   determines a first left-eye image signal, a first right-eye image signal, a second left-eye image signal, and a second right-eye image signal included in the image source signal as an image signal respectively displayed in the first group pixel and the second group pixel per one frame unit of the image source signal, and
   forms a basic alignment corresponding to the unit display period by arranging the determined image signals according to the display sequence.

3. The display device as claimed in claim 2, wherein the image processor forms the basic alignment by arranging image signals according to a sequence of an image signal displayed in the first group pixel among the first left-eye image signal, an image signal displayed in the second group pixel among the first left-eye image signal, an image signal displayed in the first group pixel among the first right-eye image signal, an image signal displayed in the second group pixel among the first right-eye image signal, an image signal displayed in the first group pixel among the second left-eye image signal, an image signal displayed in the second group pixel among the second left-eye image signal, an image signal displayed in the first group pixel among the second right-eye image signal, and an image signal displayed in the second group pixel among the second right-eye image signal.

4. The display device as claimed in claim 2, wherein the image processor forms the basic alignment by arranging image signals according to a sequence of an image signal displayed in the first group pixel among the first right-eye image signal, an image signal displayed in the second group pixel among the first right-eye image signal, an image signal displayed in the first group pixel among the first left-eye image signal, an image signal displayed in the second group pixel among the first left-eye image signal, an image signal displayed in the first group pixel among the second right-eye image signal, an image signal displayed in the second group pixel among the second right-eye image signal, an image signal displayed in the first group pixel among the second left-eye image signal, and an image signal displayed in the second group pixel among the second left-eye image signal.

5. The display device as claimed in claim 2, wherein the image processor:
repeats the basic alignment an integer multiple of times in the unit display period, and
arranges image signals of the image type corresponding to the current frame unit of the image source signal among the determined image signals and adds the arranged image signals to the repeated basic alignment.

6. The display device as claimed in claim 1, wherein:
the display unit further includes a plurality of scan lines transmitting a plurality of scan signals to the first and second group pixels,
the display unit further includes a plurality of data lines transmitting a plurality of data signals to the first and second group pixels, and
a light emission period, during which the first group pixels emit light according to the plurality of data signals, and a scan period, during which the plurality of data signals is transmitted to the second group pixels, overlap each other.

7. The display device as claimed in claim 6, wherein:
each of the first and second group pixels includes a driving transistor providing a driving current according to a written data signal, and includes an organic light emitting diode connected to the driving transistor and emitting light according to the driving current, and
a first power source voltage applied to the driving transistor is lower than a second power source voltage applied to a cathode of the organic light emitting diode during a reset period, the reset period being a period during which a voltage of an anode of the organic light emitting diode is reset.

8. The display device as claimed in claim 7, wherein:
each of the first and second group pixels includes a capacitor connected to a gate of the driving transistor, the capacitor being coupled to the first power source voltage, and a threshold voltage of the driving transistor is stored in the capacitor during a compensation period, the compensation period being a period during which the driving transistor is diode-connected.

9. The display device as claimed in claim 8, wherein the first power source voltage of the light emission period is higher than the first power source voltage of the reset period, the compensation period, and the scan period.

10. The display device as claimed in claim 8, wherein one frame of the display device includes the reset period, the compensation period, the scan period, and the light emission period, and is operated in a sequence of the reset period, the compensation period, the scan period, and the light emission period.

11. The display device as claimed in claim 1, wherein blank periods between first fields, formed of frames in which the first group pixel emits light, and second fields, formed of frames in which the second group pixel emits light, are set to be different from each other according to at least one of the image type and a view point of an image between adjacent first and second fields.

12. The display device as claimed in claim 11, wherein numbers of blanks between the first fields and the second fields are set to be different from each other according to at least one of the image type and the view point of the image, the number of blanks between the first field and the second field indicating a period between a light emission period of the first field and a light emission period of an adjacent second field.

13. The display device as claimed in claim 12, wherein the numbers of blanks are set to be different from each other according to at least one of the image type and the view point of the image in order to prevent the number of blanks from being a fractional number.

14. The display device as claimed in claim 13, wherein:
a default number of blanks is set to an integer acquired by dividing the number of blanks allocated to each frame unit of the image source signal by the number of frames of the display device included in one frame unit of the image source signal and eliminating numbers below the decimal point from the division result, and
when the image type of the first field is different from the image type of an adjacent second field, the number of blanks is set to be greater than the default number of blanks.

15. The display device as claimed in claim 13, wherein:
an integer acquired by dividing the number of blanks allocated to each frame unit of the image source signal by the number of frames of the display device included in one frame unit of the image source signal and eliminating numbers below the decimal point from the division result is set to a default number of blanks, and
when a view point of an image of the first field is different from that a view point of an image of an adjacent second field, the number of blanks is set to be greater than the default number of blanks.

16. The display device as claimed in claim 12, further comprising a timing controller setting the numbers of blanks between vertical synchronization signals to be different from each other according to the image type and a view point of an image between adjacent fields.

17. The display device as claimed in claim 1, wherein:
the display device is configured to operate in concert with first shutter spectacles that are opened while the first image is displayed in the first group pixel and the second group pixel, and the display device is configured to operate in concert with second shutter spectacles that are opened while the second image is displayed in the first group pixel and the second group pixel.

18. The display device as claimed in claim 17, wherein:
the first shutter spectacles include a first left-eye lens opened while a first left-eye image signal of the first image is displayed in the first group pixel and the second group pixel, and include a second right-eye lens opened while a first right-eye image signal of the first image is displayed in the first group pixel and the second group pixel, and
the second shutter spectacles include a second left-eye lens opened while a second left-eye image signal of the second image is displayed in the first group pixel and the second group pixel, and include a second right-eye lens opened while a second right-eye image signal of the second image is displayed in the first group pixel and the second group pixel.

19. A display device configured to display a selected image type, the image type including a first image and a second image, as a stereoscopic image according to an image source signal representing the first image and the second image, the display device comprising:
a display unit including a first group pixel and a second group pixel;
an image processor arranging the image source signal for each frame unit of the image source signal according to a display sequence of the first image and the second image in the first group pixel and the second group pixel; and
a timing controller setting blank periods between first fields formed of frames during which the first group pixel emits light and second fields formed of frames during which the second group pixel emits light according to at least one of the image type and a view point of an image between a first field and a second field that are adjacent to each other.

20. The display device as claimed in claim 19, wherein:
the image source signal includes a first left-eye image signal, a first right-eye image signal, a second left-eye image signal, and a second right-eye image signal,
a unit display period is a period during which the first left-eye image signal, the first right-eye image signal, the second left-eye image signal, and the second right-eye image signal are displayed according to the display sequence in the first group pixel and the second group pixel by one frame unit of the image source signal, and
the image processor changes the image type displayed during a remaining period, other than a period that is an integer multiple of the unit display period, of one frame unit of the image source signal, and adds an image source signal alignment corresponding to the remaining period to an image source signal alignment corresponding to the period of integer that is the multiple of the unit display period.

21. The display device as claimed in claim 20, wherein a view point of the image of the first left-eye image signal is different from a view point of the image of the right-eye image signal, and a view point of the image of the second left-eye image signal is different from a view point of the image of the second right-eye image signal.

22. The display device as claimed in claim 19, wherein:
one frame of the display device includes a scan period, during which a data signal is written in a plurality of pixels, and includes a light emission period, during which the plurality of pixels emit light according to the written data signal, and
a light emission period of the first field and a scan period of the second field overlap each other.

23. The display device as claimed in claim 22, wherein the frame of the display device further includes:
a reset period for resetting an anode voltage of an organic light emitting diode of the pixel, and
a compensation period compensating a threshold voltage of a driving transistor supplying a driving current to the organic light emitting diode.

24. The display device as claimed in claim 23, wherein a level of a first power source voltage supplied to the driving transistor is different among at least one of the reset period, the compensation period, and the scan period during the light emission period.

25. A driving method of a display device that includes a first group pixel and a second group pixel, the method comprising:
arranging image source signals representing a first image and a second image according to a display sequence of the first image and the second image in the first group pixel and the second group pixel for each frame unit of the image source signal;
repeating a basic alignment corresponding to a unit display period by a number of times that the unit display period is included in the frame unit of the image source signal, the unit display period being a period during which the first image and the second image are displayed in the first group pixel and the second group pixel for each frame of the display device;
alternately selecting an image type to be displayed during a remaining period, the remaining period being a period after the unit display period is passed the integer multiple during one frame period of the image source signal by one frame unit of the image source signal, and
adding, to the repeated basic alignment, an image source signal alignment corresponding to the remaining period.

26. The method as claimed in claim 25, wherein the arranging of the image source signals includes:
determining each of a first left-eye image signal, a first right-eye image signal, a second left-eye image signal, and a second right-eye image signal included in the image source signal for an image signal displayed in the first group pixel and an image signal displayed in the second group pixel for each frame unit of the image source signal; and
forming the basic alignment by arranging the determined image signals according to the display sequence.

27. The method as claimed in claim 26, wherein the adding of the image source signal alignment corresponding to the remaining period includes:
arranging image signals of the selected image type among the determined image signals by a number of frames of the display device, corresponding to the remaining period, and
adding the arranged image signals to the repeated basic alignment.

28. The method as claimed in claim 25, further comprising:
a light emission step of the first group pixel according to a plurality of written data signals; and
a scan step for transmitting a plurality of data signals to the second group pixel,
wherein the light emission step and the scan step are temporally overlapped with each other.

29. The method as claimed in claim 28, further comprising:
resetting a voltage of an anode of an organic light emitting diode connected to a driving transistor, to which a driving current flows according to a written data signal,
emitting light according to the driving current by decreasing a first power source voltage applied to the driving transistor; and
a compensation step for diode-connection of the driving transistor and storing a threshold voltage of the driving transistor in a capacitor.

30. The method as claimed in claim 25, further comprising setting blank periods between first fields, formed of frames during which the first group pixel emits light, and second fields, formed of frames during which the second group pixel emits light, to be different from each other according to at least one of the image type and a view point of an image between adjacent first and second fields.

31. The method as claimed in claim 30, wherein:
the setting of the blank periods includes setting numbers of blanks between the first fields and the second fields to be different from each other according to at least one of the image type and a view point of an image between the first field and the second field, and
the number of blanks between the first field and the second field represents a period between a light emission period of the first field and a light emission period of an adjacent second field.

32. The method as claimed in claim 31, wherein the setting of the number of blanks includes:
setting a default number of blanks with an integer acquired by dividing the number of blanks allocated to each frame unit of the image source signal by the number of frames of the display device included in one frame unit of the image source signal, and eliminating numbers below the decimal point from the division; and
setting the number of blanks to be greater than the default number of blanks when the image type of the first field is different from the image type of an adjacent second field.

33. The method as claimed in claim 31, wherein the setting of the number of blanks includes:
setting a default number of blanks with an integer acquired by dividing the number of blanks allocated to each frame unit of the image source signal by the number of frames of the display device included in one frame unit of the image source signal, and eliminating numbers below the decimal point; and
setting the number of blanks to be greater than the default number of blanks when a view point of the first field is different from a view point of an adjacent second field.

* * * * *